Figure 1A:
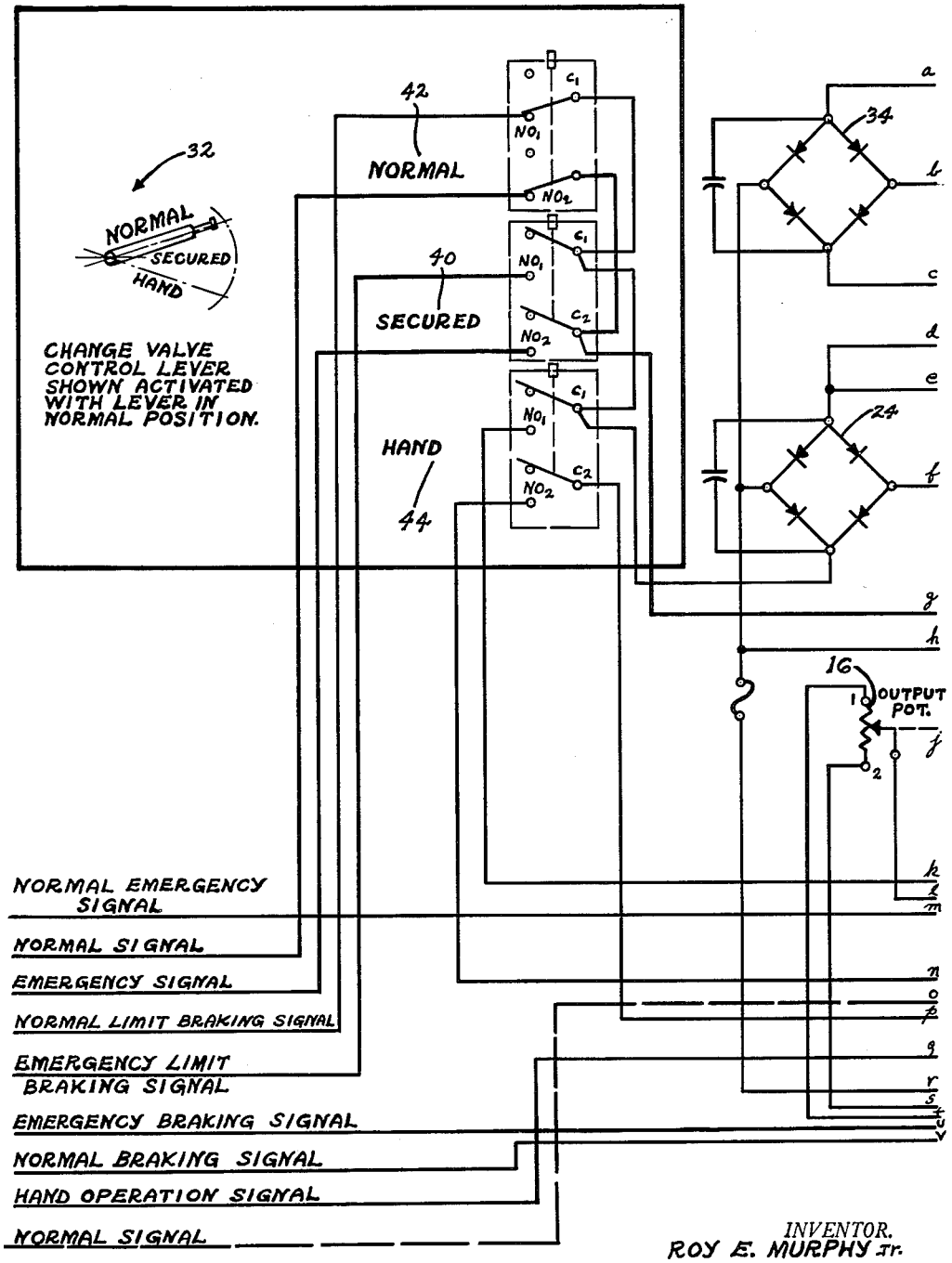

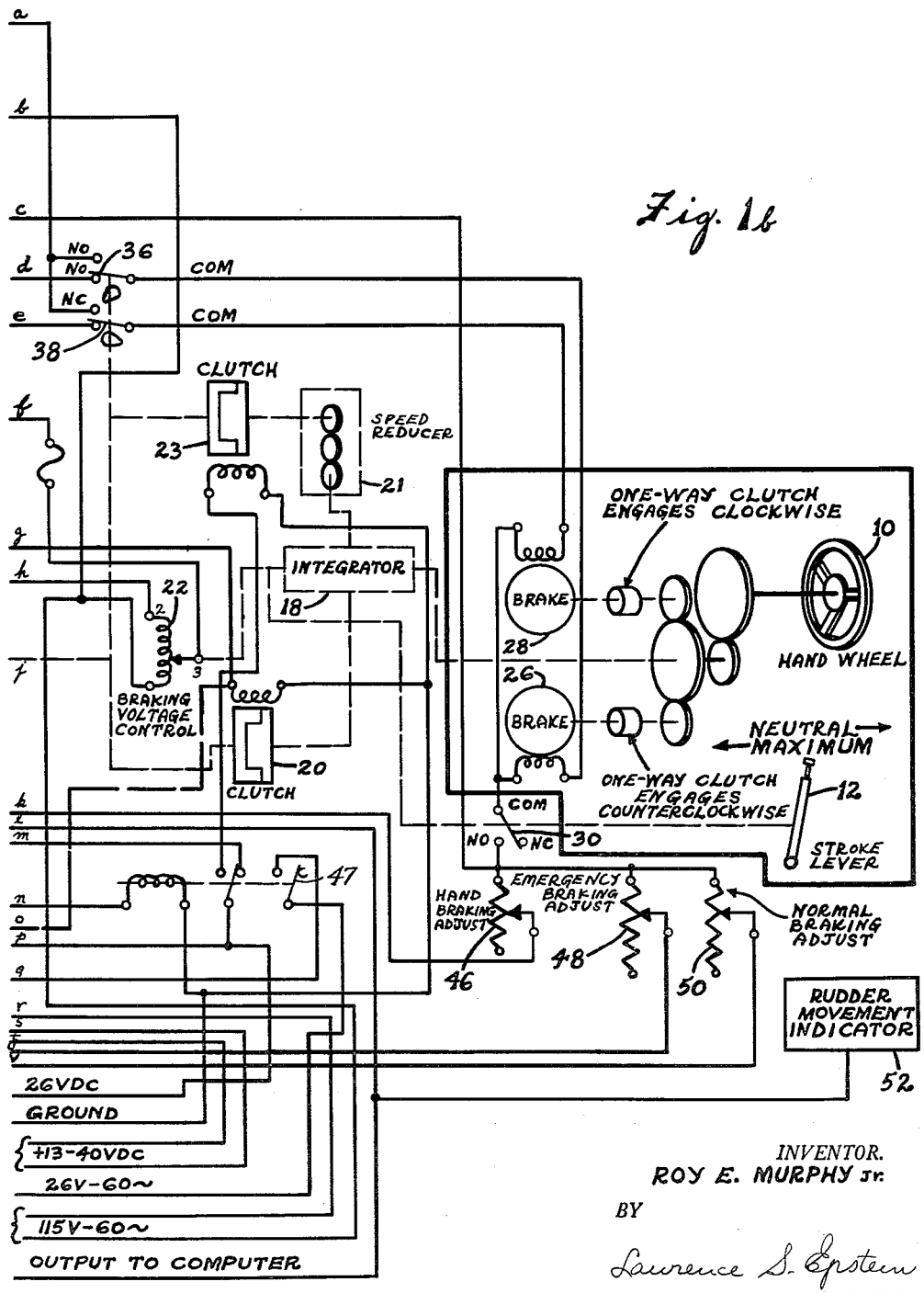

United States Patent Office 3,092,683
Patented June 4, 1963

3,092,683
DEVICE FOR SIMULATING THE KINESTHESIA OF SUBMARINE CONTROLS
Roy E. Murphy, Jr., Palo Alto, Calif., assignor, by mesne assignments, to the United States of America as represented by the Secretary of the Navy
Filed Oct. 26, 1960, Ser. No. 65,242
3 Claims. (Cl. 35—10.2)

This invention relates to electronic apparatus for simulating the rudder movements of underwater craft and provide kinesthetic sensations which accompany a change in rudder angle. This invention is directed towards the simulation of rudder movements and kinesthetic sensations on a universal submarine trainer. This universal submarine trainer is the subject of a co-pending application, Serial No. 3,466, filed January 19, 1960, and entitled Universal Submarine Simulator.

This invention is particularly useful in providing the realistic simulation desired in a universal submarine trainer whereby training is more rapid and more thorough because of the realistic simulation. Prior to the utilization of the instant device, purely mechanical or a combination of mechanical and electrical means were utilized to provide kinesthetic sensations. This resulted in bulky devices and simulations which were not quite realistic. However, in the use of the instant device, the kinesthetic sensations are realistically simulative of the actual kinesthetic feel of controls aboard a submarine and the device is electronic and light in weight.

It is a primary object of the instant invention to provide means for realistically simulating the kinesthetic sensations of controls on a submarine trainer.

A further object of the instant invention is to provide a device which realistically simulates the kinesthetic sensations of submarine controls by electronic means.

Another object of the instant invention is to provide submarine controls which have variable pressures and forces applied toward creating the realistic simulation of actual shipboard controls.

Other objects and many of the attendant advantages of this invention will be readily appreciated as the same becomes better understood by reference to the following detailed description when considered in connection with the accompanying drawing which is a block schematic diagram illustrating the elements of the apparatus. The invention has many applications and the number of different controls which can be simulated is only limited by the coupling between the control and the reverse force producing elements thereon.

Referring now to the figure comprising portions 1a and 1b, the steering station is provided with the following controls: steering handle 10; stroke lever 12; and change valve 32. These controls simulate the following modes of operation: normal; secure; and hand operation. All the controls are provided with kinesthetic effects in the simulator. The function of each control is explained to give a better understanding of the system operation.

Steering Hand Wheel

The purpose of the steering hand wheel 10 is to produce movement of the output potentiometer 16. The amount of output from potentiometer 16 is indicated on rudder movement indicator 52. The hand wheel drives the wiper of the output potentiometer 16 through an integrator 18 and a magnetic clutch 20. The output signal from the potentiometer 16 goes to the rudder ancillary computer shown in co-pending application, Serial No. 3,466, filed January 19, 1960, and entitled Universal Submarine Simulator.

Stroke Lever

The purpose of the stroke lever 12 is to vary the turns required by the steering hand wheel 10 to produce a given rudder angle change. The stroke lever 12 is mechanically coupled to the integrator 18. The integrator 18 is mechanically coupled to magnetic clutch 20 and through speed reducer 21 to magnetic clutch 23. By moving the stroke lever, the ratio of integration can be changed from zero output in the neutral position to a maximum output. The stroke lever is also coupled to a powerstat 22 whose A.C. output is rectified by full wave rectifier 24, the resulting D.C. being applied to the magnetic particle brakes 26 and 28 which are geared to the hand wheel. These magnetic brakes produce the kinesthetic and drag effect on the steering hand wheel. With the stroke lever in the neutral position, the magnetic particle brakes are disconnected by switch 30 and the integrator output is zero. This leaves the steering hand wheel 10 free to turn.

Change Valve

The purpose of the change valve 32 is to select the mode of operation of the steering hand wheel 10. The change valve has three positions; a secured center position, a normal power position and a hand position. In the secured position, sufficient D.C. power from the full wave power rectifier 34 is applied to the magnetic particle brakes 26 and 28 through switch 40 to lock the steering hand wheel.

In the normal position, the hand wheel locking power is disconnected by switch 40 and operating power from rectifier 24 is connected to the magnetic particle brakes through switch 42. The resulting kinesthetic drag effect is controlled by rheostat 22. The locking power from rectifier 24 is applied to the magnetic particle brakes through limit switches 36 and 38 to limit hand wheel movement. These limit switches 36 and 38 are controlled by cams which are mechanically coupled to the outputs of clutches 20 and 23. These cams actuate switches 36 and 38 to apply locking power to brakes 26 and 28 to lock hand wheel 10 at particular points to simulate mechanical stops. Magnetic clutch 20 which couples the integrator 18 output to the output potentiometer 16 is energized by 26 volts D.C., providing simulated hydraulic power is available. The system will then operate normally.

In the hand position of change valve 32, switch 44 and relay 47 are actuated and simulated hydraulic power is disconnected. This de-energizes the magnetic clutch 20 previously energized in the normal position operation. Simultaneously, the magnetic clutch 23 in the other output path from the integrator 18 which goes through a speed reducer 21 and then to the output potentiometer 16, is energized. The result is to simulate pumping hydraulic pressure by hand, thus requiring a large number of turns of the steering hand wheel 10 to produce a given rudder angle as simulated by output potentiometer 16.

Variable resistors 46, 48 and 50, respectively, provide adjustment for hand braking, emergency braking, and normal braking signals.

Obviously the invention is not limited to the single embodiment shown and described herein, but may be varied or modified within the scope of the following claims.

What is claimed is:

1. In a submarine training device, simulating apparatus for loading operator controlled submarine controls in accordance with hydrodynamic forces acting on said controls, said apparatus comprising simulated submarine steering means mounted within said training device, braking means operatively connected to said steering means for controlling the loading applied to said steering means, braking control means operatively connected to said steering means and said braking means whereby said braking control means provide an output which is proportional to the position of said steering means, said braking control means output being operatively connected to said braking means whereby the amount of braking applied to said steering means is proportional to the position of said steering means, said braking control means including an adjustably variable mechanical integration means operatively connected to said steering means, and simulated submarine stroke lever means operatively connected to said mechanical integration means for manual adjustment thereof, said stroke lever having a neutral position and a variable operating position, and speed reduction means and a change valve control lever, said speed reduction means being operatively connected to said mechanical integration means and controlled by said change valve lever, a first variable clutch means and a second variable clutch means, said first clutch means being connected to the output of said integration means, said second clutch means being connected to the output of said speed reduction means, an output potentiometer, the outputs of said first and second clutch means being connected to said output potentiometer for control thereof whereby said potentiometer simulates a rudder movement, said change valve lever having a secure position, a normal position and a hand position, whereby operation of the change valve lever to its secure position locks the steering hand wheel in its position and operation of the change valve control lever to the hand position interconnects said speed reduction means to said output potentiometer means through said second clutch means whereby said handwheel has to be turned many more times to obtain a given simulated rudder movement than which would be obtained with the change-valve control lever in its normal position.

2. The combination of claim 1 wherein said braking means comprises two unidirectional brakes, the first of said brakes controlling the loading on said steering handwheel in a clockwise direction and the second of said brakes controlling the loading on said steering handwheel in a counterclockwise direction.

3. In a submarine training device, simulating apparatus for loading operator controlled submarine controls in accordance with hydrodynamic forces acting on said controls, said apparatus comprising simulated submarine steering means mounted within said training device, braking means operatively connected to said steering means for controlling the loading applied to said steering means, braking control means operatively connected to said steering means and said braking means whereby said braking control means provide an output which is proportional to the position of said steering means, said braking control means output being operatively connected to said braking means whereby the amount of braking applied to said steering means is proportional to the position of said steering means, said braking control means including an adjustably variable mechanical integration means operatively connected to said steering means and simulated submarine stroke lever means operatively connected to said mechanical integration means for manual adjustment thereof, said stroke lever having a neutral position and a variable operating position.

References Cited in the file of this patent
UNITED STATES PATENTS

| | | |
|---|---|---|
| 2,350,351 | Grunberg | June 6, 1944 |
| 2,460,743 | Germanton | Feb. 1, 1949 |
| 2,510,174 | Heller | June 6, 1950 |
| 2,808,659 | Dehmel | Oct. 8, 1957 |
| 2,851,795 | Sherman | Sept. 16, 1958 |